(12) United States Patent
Claxton et al.

(10) Patent No.: US 12,618,011 B2
(45) Date of Patent: May 5, 2026

(54) PROCESS FOR SYNTHESISING HYDROCARBONS

(71) Applicant: JOHNSON MATTHEY DAVY TECHNOLOGIES LIMITED, London (GB)

(72) Inventors: Henry Arthur Claxton, London (GB); Andrew James Coe, London (GB); Mark Joseph Mckenna, Billingham (GB); Paul Robert Ticehurst, London (GB)

(73) Assignee: Johnson Matthey Davy Technologies Limited, London (GB)

( * ) Notice: Subject to any disclaimer, the term of this patent is extended or adjusted under 35 U.S.C. 154(b) by 553 days.

(21) Appl. No.: 18/006,504

(22) PCT Filed: Sep. 17, 2021

(86) PCT No.: PCT/GB2021/052421
§ 371 (c)(1),
(2) Date: Jan. 23, 2023

(87) PCT Pub. No.: WO2022/079407
PCT Pub. Date: Apr. 21, 2022

(65) Prior Publication Data
US 2023/0295517 A1 Sep. 21, 2023

(30) Foreign Application Priority Data

Oct. 16, 2020 (GB) ...................................... 2016416

(51) Int. Cl.
*C10G 2/00* (2006.01)
*C01B 3/16* (2006.01)
(Continued)

(52) U.S. Cl.
CPC .................. *C10G 2/32* (2013.01); *C01B 3/16* (2013.01); *C01B 3/34* (2013.01); *C10G 3/50* (2013.01);
(Continued)

(58) Field of Classification Search
CPC ..... C01B 3/16; C01B 3/34; C01B 2203/0415; C01B 2203/062; C10G 3/50;
(Continued)

(56) References Cited

U.S. PATENT DOCUMENTS 9,163,180 B2 10/2015 Marion et al.
2006/0211777 A1 9/2006 Severinsky
(Continued)

FOREIGN PATENT DOCUMENTS

CA 3 067 061 A1 12/2018
CL 2023000759 A1 9/2023
(Continued)

OTHER PUBLICATIONS

Ahad Nuvaid, et al., "Fischer-Tropsch acid water processing by Kolbe electrolysis", Fuel, vol. 211, Sep. 23, 2017 (Sep. 23, 2017), pp. 415-419, XP085270546, IS ,SN: 0016-2361, DOI: 10.1016/J. FUEL.2017.09.075 figures 1, 2; the whole document; abstract.

*Primary Examiner* — Jafar F Parsa
(74) *Attorney, Agent, or Firm* — BakerHostetler

(57) ABSTRACT

A process for synthesising hydrocarbons is described comprising the steps of (a) making a synthesis gas comprising hydrogen, carbon monoxide and carbon dioxide from a feedstock in a synthesis gas generation unit, (b) removing carbon dioxide to produce a carbon dioxide stream and purified synthesis gas comprising hydrogen and carbon monoxide for synthesis in a Fischer-Tropsch hydrocarbon synthesis unit wherein (i) at least a portion of the FT water stream is fed to an electrolysis unit to provide an oxygen (Continued)

stream, which is fed to the synthesis gas generation unit. Carbon dioxide stream recovered from the carbon dioxide removal unit and a portion of the hydrogen stream produced by the electrolysis unit are fed to a reverse water-gas shift unit to produce a carbon monoxide stream, with carbon monoxide stream from the reverse water-gas shift unit is fed to the Fischer-Tropsch hydrocarbon synthesis unit.

18 Claims, 1 Drawing Sheet

(51) Int. Cl.

| | |
|---|---|
| *C01B 3/34* | (2006.01) |
| *C10G 3/00* | (2006.01) |
| *C10G 49/00* | (2006.01) |
| *C10J 3/00* | (2006.01) |
| *C10K 1/00* | (2006.01) |
| *C10K 1/08* | (2006.01) |
| *C10K 3/02* | (2006.01) |
| *C25B 1/04* | (2021.01) |
| *C25B 15/08* | (2006.01) |

(52) U.S. Cl.

CPC .............. *C10G 49/007* (2013.01); *C10J 3/00* (2013.01); *C10K 1/005* (2013.01); *C10K 1/08* (2013.01); *C10K 3/026* (2013.01); *C25B 1/04* (2013.01); *C25B 15/081* (2021.01); *C01B 2203/0415* (2013.01); *C01B 2203/062*

(2013.01); *C10G 2300/1022* (2013.01); *C10G 2300/4043* (2013.01); *C10G 2300/4081* (2013.01); *C10J 2300/0913* (2013.01); *C10J 2300/0959* (2013.01); *C10J 2300/1659* (2013.01); *C10J 2300/1684* (2013.01)

(58) Field of Classification Search

CPC .......... C10G 49/007; C10G 2300/4043; C10G 2300/4081; C25B 1/04; C25B 15/081

See application file for complete search history.

(56) References Cited

U.S. PATENT DOCUMENTS

| | | | |
|---|---|---|---|
| 2013/0149767 | A1 | 6/2013 | Marion et al. |
| 2013/0345325 | A1 | 12/2013 | Lecomte et al. |
| 2014/0288195 | A1 | 9/2014 | Castelli |
| 2023/0264955 | A1 | 8/2023 | Claxton et al. |

FOREIGN PATENT DOCUMENTS

| | | | |
|---|---|---|---|
| CN | 103146413 | B | 3/2017 |
| EP | 3309238 | A1 | 4/2018 |
| EP | 3578623 | A1 | 12/2019 |
| GB | 2496725 | A | 5/2013 |
| JP | 2011-200912 | A | 10/2011 |
| WO | 2005/019384 | A1 | 3/2005 |
| WO | 2009/019497 | A2 | 2/2009 |
| WO | 2011/048361 | A1 | 4/2011 |
| WO | 2012/136971 | A1 | 10/2012 |
| WO | 2015/184292 | A1 | 12/2015 |
| WO | 2016/050520 | A1 | 4/2016 |

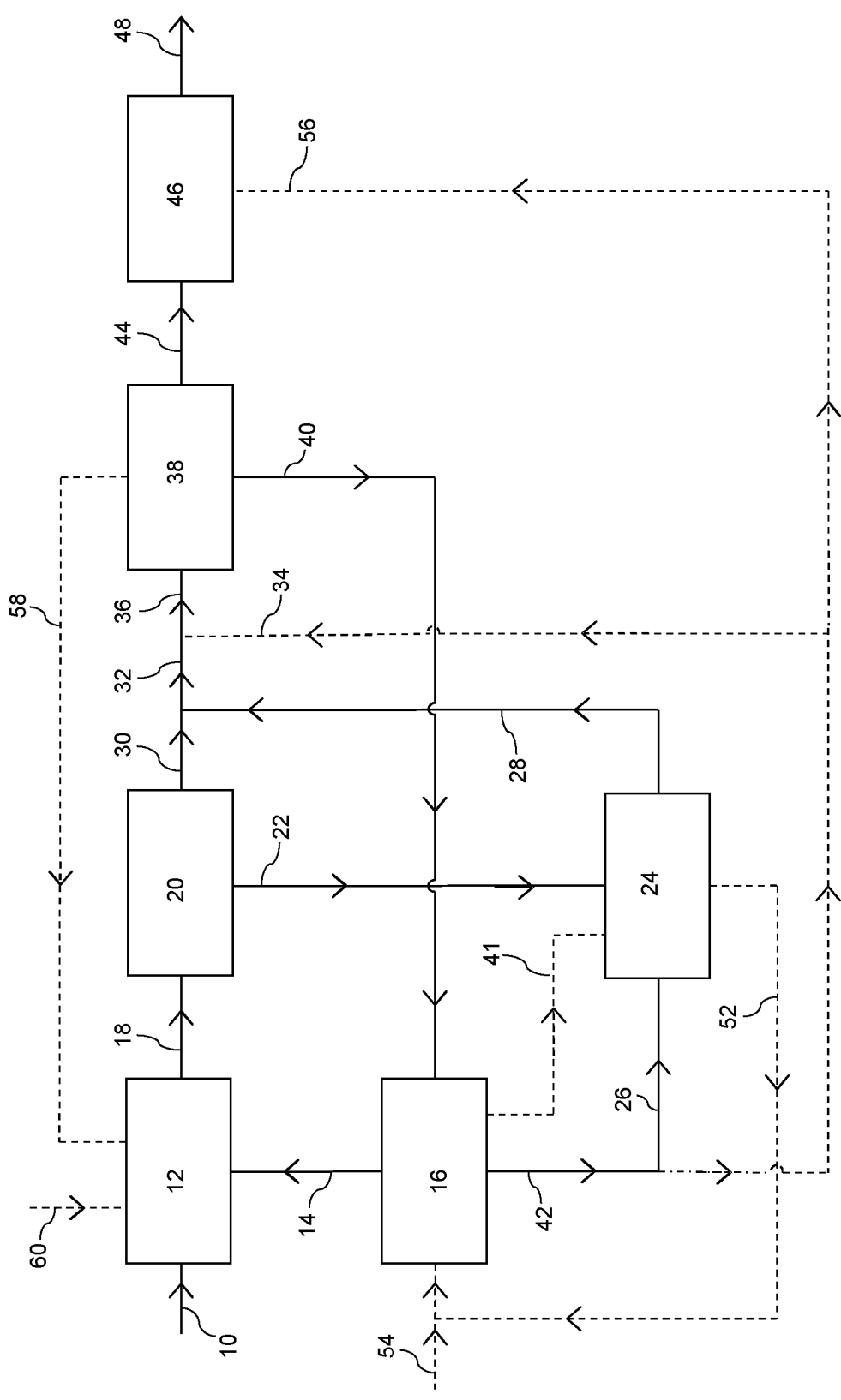

PROCESS FOR SYNTHESISING HYDROCARBONS

This invention relates to a process for synthesising hydrocarbons from synthesis gas comprising hydrogen and carbon monoxide.

Processes for synthesis hydrocarbons from synthesis gases are known. For example, U.S. Pat. No. 9,163,180 discloses process for the conversion of carbon-based material to fuel bases by a hybrid route combining direct ebullient bed liquefaction and indirect liquefaction by gasification followed by a Fischer-Tropsch synthesis, including a stage of production of hydrogen resulting from non-fossil resources and a reverse water gas reaction stage. Electrolysis is used as a source of hydrogen for the liquefaction, reverse water reaction and Fischer-Tropsch synthesis. US2014288195 discloses a process for the thermochemical conversion of a carbon-based feedstock, such as biomass, to synthesis gas containing predominantly hydrogen and carbon monoxide comprising the following steps: (a) oxycombustion of the carbon-based feedstock to create a cogeneration of electricity and of heat; (b) high-temperature electrolysis of water using heat produced in step (a); (c) reverse water-gas shift reaction starting from the carbon dioxide produced in step (a) and from the hydrogen produced in step (b).

We have realised that the process efficiency increased by using the water by-product of the Fischer-Tropsch synthesis in an electrolysis unit coupled to the reverse water-gas shift unit and Fischer-Tropsch synthesis unit.

Accordingly the invention provides a process for synthesising hydrocarbons comprising the steps of (a) making a synthesis gas comprising hydrogen, carbon monoxide and carbon dioxide from a feedstock in a synthesis gas generation unit, (b) removing carbon dioxide from the synthesis gas in a carbon dioxide removal unit to produce a carbon dioxide stream and purified synthesis gas comprising hydrogen and carbon monoxide, and (c) synthesising a mixture of hydrocarbons from the purified synthesis gas in a Fischer-Tropsch hydrocarbon synthesis unit, with co-production of a FT water stream, wherein (i) at least a portion of the FT water stream is fed to an electrolysis unit to provide an oxygen stream, which is fed to the synthesis gas generation unit, and a hydrogen stream, (ii) at least a portion of the carbon dioxide stream recovered from the carbon dioxide removal unit and a portion of the hydrogen stream produced by the electrolysis unit are fed to a reverse water-gas shift unit to produce a carbon monoxide stream, and (iii) at least a portion of the carbon monoxide stream from the reverse water-gas shift unit is fed to the Fischer-Tropsch hydrocarbon synthesis unit.

The invention further provides a system for performing the process comprising (a) a synthesis gas generation unit for making a synthesis gas comprising hydrogen, carbon monoxide and carbon dioxide from a feedstock, (b) a carbon dioxide removal unit coupled to the synthesis gas generation unit for removing carbon dioxide from the synthesis gas to produce a carbon dioxide stream and purified synthesis gas comprising hydrogen and carbon monoxide, and (c) a Fischer-Tropsch hydrocarbon synthesis unit coupled to the carbon dioxide removal unit for synthesising a mixture of hydrocarbons from the purified synthesis gas, with co-production of a FT water stream, wherein (i) an electrolysis unit is coupled to the Fischer-Tropsch hydrocarbon synthesis unit, configured to be fed with at least a portion of the FT water to provide an oxygen stream, which is configured to be fed to the synthesis gas generation unit, and a hydrogen stream, (ii) a reverse water-gas shift unit is coupled to the carbon dioxide removal unit and the electrolysis unit and configured to be fed with at least a portion of the carbon dioxide stream from the carbon dioxide removal unit and a portion of the hydrogen stream produced by the electrolysis unit, to produce a carbon monoxide stream, and (iii) the Fischer-Tropsch hydrocarbon synthesis unit is coupled to the reverse water-gas shift unit to receive at least a portion of the carbon monoxide stream.

In the present invention, the carbon dioxide recovered from the synthesis gas by the carbon dioxide removal unit is combined with hydrogen from the FT water electrolysis unit and used in the reverse water-gas shift unit to produce additional carbon monoxide which is sent to the Fischer-Tropsch synthesis to increase the hydrocarbon product yield. FT water electrolysis may conveniently use electricity from renewable sources such as solar, wind or tidal power. By using renewable electricity, the overall carbon intensity of the process can be negative, resulting in overall negative carbon dioxide emissions. It also avoids the need to carbon capture and storage. Overall, the process of the present invention maximises the production of liquid fuels from the feed stock and helps to reduce carbon dioxide emissions.

In the process of the invention the feedstock fed to the process may suitably comprise a gaseous feedstock such as natural gas or associated gas, or a solid feedstock such as coal, biomass or municipal solid waste or equivalent containing non-biogenic carbon. The feedstock may therefore comprise coal, biomass, algae, solid hydrocarbon waste, industrial polymers, organic waste and/or household plastics. These feedstocks can be used alone or as a mixture of two or more of them in equal or different proportions. The feedstocks may also comprise a portion of the effluents resulting from the Fischer-Tropsch synthesis, or from the gasification of feedstocks. Liquid feedstocks, resulting from oil and/or from the refining of oil, products resulting from the thermochemical or hydrothermal conversion of these feedstocks may be used. The present invention provides significant synergies where the syngas is generated from coal, municipal solid waste or equivalent and biomass feedstocks where the natural hydrogen to carbon monoxide ratio is typically lower than the 2:1 ratio required for efficient Fischer-Tropsch synthesis. A particularly preferred feedstock is biomass, municipal solid waste or equivalent containing non-biogenic carbon or a mixture of these.

Gaseous feedstocks are desirably treated to remove volatile contaminants such as sulphur, mercury or chloride compounds upstream of the synthesis gas generation unit as these contaminants may poison the reforming, reverse water-gas shift and Fischer-Tropsch catalysts. Suitable adsorbents for these contaminants are known.

The synthesis gas generation unit may be any unit that converts the feedstock into a synthesis gas comprising hydrogen, carbon monoxide and carbon dioxide. Depending on the nature of the feedstock various syngas generation technologies may be preferred. For example, where the feedstock is natural gas, the synthesis gas generation unit preferably comprises a catalytic partial oxidation unit, a non-catalytic partial oxidation unit or an autothermal reformer. Alternatively, where the feedstock is coal, biomass or municipal solid waste or equivalent containing non-biogenic carbon, the synthesis gas generation unit preferably comprises a gasifier. Any known gasification technology may be used. Preferably, the gasification is carried out by partial oxidation, which comprises combusting the feedstock under sub-stoichiometric conditions at high temperature, generally between 800° C. and 1600° C., with air or oxygen in order to obtain a raw synthesis gas. When a nitrogen-free synthesis gas is desired, this process uses oxygen, produced by air distillation according to conventional techniques, such as, for example, an air separation unit (ASU). Gasification produces synthesis gas and a residual fraction comprising tar oils. The synthesis gas is generally a gas mixture comprising carbon monoxide, hydrogen, water vapour and carbon dioxide. In addition, it typically will comprise sulphur-comprising, nitrogen-comprising and halogen-comprising impurities. Common sulphur-containing impurities are carbonyl sulphide (COS) and hydrogen sulphide ($H_2S$). These impurities, where present, are desirably removed upstream of the Fischer-Tropsch hydrocarbon synthesis unit using one or more contaminant removal stages by washing (absorption), by passing the raw synthesis gas through one or beds of a suitable adsorbent, or by a mixture of these. Synthesis gas purification may be performed in one or more stages before and/or after the carbon dioxide removal unit.

The synthesis gas generation units consume oxygen, that may be provided by the electrolysis unit. This has the benefit of reducing the capital investment in an air separation plant and/or reduces the power consumption by an air separation plant, if required. The oxygen necessary for the synthesis gas generation unit preferably originates solely from the decomposition of water by electrolysis in the electrolysis unit. This exhibits the advantage of eliminating or reducing the size of the air separation unit.

The synthesis gas recovered from the synthesis gas generation unit may be de-watered if desired by cooling in one or more stages to below the dew point to condense any steam present, and the condensate removed using one or more gas-liquid separators.

The synthesis gas contains carbon dioxide, which is removed using a carbon dioxide removal unit. The carbon dioxide removal may include one or more vessels providing a physical wash system or a reactive wash system, preferably a reactive wash system, especially an amine wash system. The carbon dioxide may be removed by a conventional acid gas recovery unit (AGRU). This has the benefit of additionally removing hydrogen sulphide that may otherwise poison downstream catalysts. In a conventional AGRU a de-watered synthesis gas stream is contacted with a stream of a suitable absorbent liquid, such as an amine, for example an aqueous solution of monoethanolamine (MEA), of methyldiethanolamine (MDEA) or of dimethyletha-nolamine (DMEA), particularly methyl diethanolamine (MDEA) solution, so that the carbon dioxide is absorbed by the liquid to give a laden absorbent liquid and a gas stream having a decreased content of carbon dioxide. The laden absorbent liquid is then regenerated by heating, to desorb the carbon dioxide and to give a regenerated absorbent liquid, which is then recycled to the carbon dioxide absorption stage. Heat from the regeneration of the laden absorbent may be recovered from within the process. For example, a portion of the synthesis gas from the synthesis gas generation unit may be used to heat and the laden absorbent or may be used to generated steam and a portion of the steam used to heat the laden absorbent. Alternatively, the laden absorbent may be heated in heat exchange with a product stream from the Fischer-Tropsch synthesis unit. Alternatively, in place of the washing with amines, cold methanol or a glycol may be used in a similar manner as the amine to capture the carbon dioxide. For example, the Rectisol® process, using cold methanol may be operated in two stages to remove carbonyl sulphide (COS) and hydrogen sulphide ($H_2S$), followed by carbon dioxide. If the carbon dioxide separation step is operated as a single pressure process, i.e. essentially the same pressure is employed in the absorption and regeneration steps, only a little recompression of the recycled carbon dioxide will be required.

The removal of carbon dioxide from the synthesis gas produces a purified synthesis gas comprising hydrogen and carbon monoxide. Small amounts of carbon dioxide, methane and inert gases, such as nitrogen may also be present, but this is undesirable to prevent their build up in the Fischer-Tropsch synthesis unit. Accordingly, one or more purification units may be provided downstream of the carbon dioxide removal unit, if desired, so that the purified synthesis gas consists essentially of hydrogen and carbon monoxide.

The purified synthesis gas may be heated, if desired, using any available heat source to the inlet temperature for the Fischer-Tropsch synthesis unit.

The purified synthesis gas is fed to a Fischer-Tropsch hydrocarbon synthesis unit that synthesises a mixture of hydrocarbon products.

The Fischer-Tropsch hydrocarbon synthesis unit may comprise one or more Fischer-Tropsch reaction vessels containing a Fischer-Tropsch catalyst. The Fischer-Tropsch conversion stage can be carried out according to any one of the known processes, using any one of the known catalysts, in particular based on iron or cobalt, and is not limited to a specific process or catalyst.

The Fischer-Tropsch process involves a series of chemical reactions that produce a variety of hydrocarbons, ideally having the formula ($C_nH_{2n+2}$). The more useful reactions produce alkanes as follows:

$$(2n+1)H2 + nCO \rightarrow CnH2n+2 + nH2O,$$

where n is typically 5-100 or higher, with preferred products having n in the range 10-20.

Generally, the following are distinguished: the high-temperature (320-350° C.) Fischer-Tropsch process, operating with iron-based catalysts, and the "low-temperature" (between 220-240° C.) Fischer-Tropsch process, operating with catalysts based on iron or on cobalt. Cobalt-based catalysts typically operate well at a hydrogen to carbon monoxide molar ratio in the feed gas of approximately 2, often of between 1.8 and 2.5 and preferably in the vicinity of 2.15. When the Fischer-Tropsch catalyst is based on iron, use may be made of hydrogen to carbon monoxide molar ratios of between 0.8 and 2 and generally between 1.2 and 1.8. A person skilled in the art, depending on the feedstock available may therefore select the most suitable Fischer-Tropsch synthesis catalyst for the process. Cobalt catalysts may be preferred due to their lower $CO_2$-selectivity which reduces the size and cost of the Fischer-Tropsch synthesis unit and increases the efficiency of the process to produce hydrocarbon products.

The feed gas for the Fischer-Tropsch synthesis comprises the purified synthesis gas, which may have a hydrogen to carbon monoxide molar ratio in the range 1.6 to 2.5:1, and at least a portion and preferably all of the carbon monoxide produced by the reverse water-gas shift unit. Therefore, for optimal performance of the process, it may be necessary to supplement the feed gas to the Fischer-Tropsch synthesis with a portion of the hydrogen from the electrolysis unit to achieve the desired ratio. The optimal hydrogen to carbon monoxide molar ratio in the feed gas for cobalt-catalysed Fischer-Tropsch synthesis is about 2:15. Accordingly, in some embodiments, a portion of the hydrogen stream from the electrolysis unit may be fed to the Fischer-Tropsch hydrocarbon synthesis unit.

The Fischer-Tropsch reaction may be performed in a continuous or batch process using one or more reactors such as fixed-bed reactors, slurry-phase reactors, bubble-column reactors, loop reactors or fluidised bed reactors. The process may be operated at pressures in the range 0.1 to 10 MPa and temperatures in the range 170 to 350° C. The gas-hourly-space velocity (GHSV) for continuous operation is in the range 1000 to 25000 $hr^{-1}$. In the Fischer-Tropsch hydrocarbon synthesis unit, the feed gas is catalytically converted into oxygen-comprising products and into essentially linear hydrocarbons in the gas, liquid or solid form. These products are generally devoid of heteroatomic impurities and contain virtually no or very little aromatics, naphthenes and more generally rings, in particular in the case of cobalt catalysts. The Fischer-Tropsch synthesis desirably is operated to produce hydrocarbons with a carbon chain length 5.

Unreacted gas recovered from the Fischer-Tropsch hydrocarbon synthesis unit may be circulated in a loop within the unit to the one or more Fischer-Tropsch reactors to increase efficiency. To prevent a build-up of inert gases, a purge may be taken from the loop as a Fischer-Tropsch tail gas. The tail gas typically comprises methane and C2-C10 hydrocarbons in small amounts that are nevertheless a valuable source of carbon. Accordingly, in some embodiments, a tail gas comprising one or more of methane, ethane, propane, butane and C5-C10 hydrocarbons, may be recovered from the Fischer-Tropsch hydrocarbon synthesis unit, and fed to the synthesis gas generation unit, or subjected to a separate reforming step, such as pre-reforming, to form a reformed tail gas containing hydrogen. The reformed tail gas may be fed to the Fischer-Tropsch hydrocarbon synthesis unit, and/or the reverse water-gas shift unit. Hydrogen recovered from the tail gas or reformed tail gas may be used in the hydrotreating unit. The tail gas may also be subjected, if desired, to a step of carbon dioxide removal, by feeding it to a carbon dioxide removal unit.

Preferably the Fischer-Tropsch synthesis is carried out using one or more fixed bed reactors, i.e. a reaction vessel with a bed of catalyst fixed within the vessel through which the purified synthesis gas is passed. Any Fischer-Tropsch catalyst may be used, but cobalt-based Fischer-Tropsch catalysts are preferred over iron-based catalysts due to their lower carbon dioxide selectivity. Suitable cobalt Fischer-Tropsch catalysts are known, but preferred catalysts in the process comprise 9 to 20% wt Co supported on a suitable support material. Suitable catalysts therefore include agglomerates, pellets or extrudates comprising metal oxides such as alumina, zinc oxide, titania or silica, or mixtures thereof, on which the catalytically active metal, preferably cobalt, is deposited. In a particularly preferred arrangement, the Fischer-Tropsch catalyst is used in combination with a catalyst carrier suitable for use in a tubular Fischer-Tropsch reactor where the catalyst carrier containing the catalyst is disposed within one or more tubes that are cooled by circulating coolant, such as water under pressure. By "catalyst carrier" we mean a catalyst container, for example in the form of a cup or can, configured to allow a gas and/or liquid to flow into and out of the carrier and through a bed of the catalyst or catalyst precursor disposed within the carrier. Any suitable catalyst carrier may be used. In one arrangement, the catalyst carrier is that described in WO2011/048361, the contents of which are incorporated herein by reference. In an alternative arrangement, the catalyst carrier may include a catalyst monolith as disclosed in WO2012/136971, the contents of which are also incorporated herein by reference In yet another alternative arrangement, the catalyst carrier may be that disclosed in WO2016/050520, the contents of which are also incorporated herein by reference. In preferred embodiments, the Fischer-Tropsch hydrocarbon synthesis unit comprises a tubular reactor in which catalyst carriers containing a Fischer-Tropsch catalyst are disposed within one or more tubes cooled by a cooling medium.

The Fischer-Tropsch reaction above produces FT water as a by-product of the reaction. This FT water is separated in the Fischer-Tropsch hydrocarbon synthesis unit from the hydrocarbon mixture produced by the Fischer-Tropsch reaction. The separation may be performed conveniently using one or more gas-liquid or liquid-liquid separators.

In the process, at least a portion of the FT water stream is fed to an electrolysis unit to provide an oxygen stream. The FT water may be treated upstream of the electrolysis unit to remove contaminants that might interfere with the operation of the electrolysis unit.

The separation of the FT water from the product mixture produced in the FT reaction stage allows recovery of the product mixture of hydrocarbons. Gaseous hydrocarbons may be recovered for sale or recycled to the process, for example as feed to the synthesis gas generation unit as part of, or along with, the Fischer-Tropsch tail gas. Liquid hydrocarbons may be recovered for sale or subjected to upgrading to provide more valuable hydrocarbon products. The Fischer-Tropsch hydrocarbon synthesis unit therefore desirably produces one or more hydrocarbon streams, including but not limited to a molten hydrocarbon wax and/or light hydrocarbon condensate, which is liquid at ambient temperature.

The hydrocarbon products synthesised in the Fischer-Tropsch hydrocarbon synthesis unit may be used directly, for example to make base oils, or may be subsequently treated to make other products. The treatment may be in a centralized treatment or upgrading facility Desirably, the Fischer-Tropsch hydrocarbon synthesis unit is operated to produce a molten hydrocarbon wax liquid, which is subjected to upgrading treatments in a hydrotreating unit to generate liquid fuels. Accordingly, in some embodiments, at least a portion and preferably all of the liquid hydrocarbon mixture resulting from the Fischer-Tropsch synthesis may be fed as a feedstock, in the presence of hydrogen, to a hydrotreating unit. The hydrotreating unit may perform various conversions such as hydroisomerization, hydrogenation, hydrodeoxygenation, and/or hydrocracking using one or more vessels containing suitable catalysts. Hydrogen is required by the hydrotreating unit. This may be provided by various sources but is desirably provided by the electrolysis unit to minimise carbon dioxide emissions from the process. Accordingly, in some embodiments, a portion of the hydrogen stream from the electrolysis unit may be fed to the hydrotreating unit.

The hydrotreating unit may be operated at a temperature generally of between 200 and 450° C., preferably from 250. to 450° C., more preferably from 300 to 450° C. and most preferably between 320-420° C.; a pressure of between 0.2 and 15 MPa, preferably between 0.5 and 10 MPa and more preferably from 1 to 9 MPa; a liquid hourly space velocity of between 0.1 and 10 $h^{-1}$, preferably between 0.2 and 7 $h^{-1}$ and more preferably between 0.5 and 5.0 $h^{-1}$, and the hydrogen content may be between 100 and 2000 litres $H_2$ per litre of feedstock and preferably between 150 and 1500 litres $H_2$ per litre of feedstock.

The hydrotreating stage may suitably be carried out under conditions such that the conversion per pass of products with a boiling point of greater than or equal to 370° C. into products having boiling points of less than 370° C. is greater than 40% by weight and more preferably at least 50% by weight, so as to obtain middle distillates (gas oil and kerosene) having sufficiently good cold properties (pour point, freezing point) to satisfy the specifications in force for this type of fuel.

The catalysts used in this stage are known. For example, hydroisomerization and hydrocracking can be carried out according to any one of the known processes, using any one of the known catalysts, and it is not limited to a specific process or catalyst. The majority of the catalysts suitable for hydroisomerization/hydro-cracking are of the bifunctional type combining an acid function with a hydrogenating function. The acid function is generally provided via supports of high specific surface area (150 to 800 $m^2$/g generally) exhibiting a surface acidity, such as halogenated (in particular chlorinated or fluorinated) aluminas, phosphorated aluminas, combinations of boron and aluminium oxides, or silicas/aluminas.

The hydrogenating function is generally provided either by one or more metals from Group VIII of the Periodic Table of the Elements, such as iron, cobalt, nickel, ruthenium, rhodium, palladium, osmium, iridium and platinum, or by a combination of at least one metal from Group VI, such as chromium, molybdenum and tungsten, and at least one metal from Group VIII. Most conventional hydrocracking catalysts are composed of weakly acidic supports, such as silicas/aluminas. These systems are typically used to produce middle distillates of very good quality. Many catalysts of the hydrocracking market are based on silica/alumina in combination with a metal from Group VIII. These systems have a very good selectivity for middle distillates and the products formed are of good quality. According to one preferred embodiment, the hydroisomerization/hydrocracking catalyst comprises at least one hydro-dehydrogenating element chosen from the noble metals of Group VIII, preferably platinum and/or palladium, and at least one amorphous refractory oxide support, preferably silica/alumina.

The hydrocarbon products recovered from the hydrotreatment unit may be fed to a separation unit to recover the valuable hydrocarbon products. The separation unit may comprise one or more atmospheric distillation columns and optionally one or more vacuum distillation columns that separate, on the one hand, (C1-C4) gases, a naphtha fraction, at least one kerosene and/or gas oil fraction and then a heavy fraction. The heavy fraction generally exhibits an initial boiling point of at least 350° C., preferably of greater than 370° C. This fraction is advantageously recycled to hydrotreatment unit. It may also be advantageous to recycle a portion of the kerosene and/or of the diesel to the hydrotreatment unit. The gas oil and kerosene fractions may or may not be recovered separately and the cut points may be adjusted to produce the desired hydrocarbon product.

The naphtha fraction may be separated into a light naphtha fraction (C5-C6), which is preferably subjected to an isomerization in order to produce petrol, and a heavy naphtha fraction (C7-180° C.), which is preferably subjected to catalytic reforming in order to produce a reformate. The effluents from the isomerization and from the reforming may be subsequently mixed in order to form the petrol meeting the specifications. The hydrogen produced during the catalytic reforming is preferably recycled to the hydrotreatment unit. Use may also be made of the hydrogen produced by the catalytic reforming to adjust the hydrogen to carbon monoxide ratio in the Fischer-Tropsch synthesis or the feed to the reverse water-gas shift unit.

In the present invention, the carbon dioxide recovered from the synthesis gas using the carbon dioxide removal unit is converted to carbon monoxide by subjecting it to the reverse water-gas shift reaction in a reverse water-gas shift unit comprising a reverse water-gas shift vessel containing a reverse-water-gas shift catalyst. A preferred reverse water-gas shift unit comprises an autothermal reverse water-gas shift vessel containing a burner and a fixed bed of the reverse water-gas shift catalyst. The burner is fed with the carbon dioxide containing gas and an oxygen stream and combusts a portion of the hydrogen and any hydrocarbons present in the carbon dioxide-containing gas, thereby generating heat for the endothermic reverse water-gas shift reaction.

The reverse water-gas shift reaction may be depicted as follows;

$$CO_2 + H_2 \leftrightarrow CO + H_2O$$

This reaction consumes hydrogen and because the synthesis gas generation unit generally does not produce hydrogen in excess of that required for the Fischer-Tropsch synthesis, an additional source of hydrogen is required. In the present invention this is provided by the electrolysis of FT water, produced as a by-product of the Fischer-Tropsch synthesis. One or more additional sources of hydrogen may also be used. The additional source of hydrogen may be generated by steam reforming at least a portion of the Fischer-Tropsch tail gas and/or gaseous hydrocarbons recovered from the Fischer-Tropsch hydrocarbon synthesis unit. This may be performed using an adiabatic steam reformer or pre-reformer, a conventional fired steam reformer, an autothermal reformer, a compact reformer or a gas-heated reformer, or any combination of these.

The reverse water-gas shift unit makes it possible to lower the carbon dioxide emissions at the same time as converting the carbon into liquid hydrocarbons by the Fischer-Tropsch reaction, which improves the carbon yield.

The product gas stream from the reverse water-gas shift unit comprises steam. Water may be recovered, e.g. by cooling the product gas stream to below the dew point and separating condensate using one or more conventional gas-liquid separators. The condensed water may, if desired, be recycled at least in part, to the electrolysis unit to generate additional hydrogen for the process. Accordingly, in some embodiments, a water stream produced by or recovered from the reverse water gas shift unit may be fed to the electrolysis unit.

The product gas stream from the reverse water-gas shift unit may contain unreacted carbon dioxide, which is desirably removed before the gas containing carbon monoxide is provided to the Fischer-Tropsch synthesis unit. The carbon dioxide may be removed from the reverse-water-gas shift effluent using any suitable absorbent, for example as described above for the carbon dioxide removal unit. Alternatively, the carbon dioxide may be separated by a membrane separation unit. In some embodiments, the carbon dioxide may be removed from the reverse water-gas shift product gas stream by returning the reverse water-gas shift product gas stream to the carbon dioxide removal unit coupled to the synthesis gas generation unit and fed with the synthesis gas. Alternatively, a separate dedicated carbon dioxide removal unit may be provided to remove carbon dioxide just from the product gas stream recovered from the reverse water-gas shift reactor. If a liquid absorbent is used, this may have the additional benefit of removing at least part of the water from the product gas as well as the carbon dioxide.

The reverse water-gas shift reaction is promoted by high temperatures and may be carried out under similar temperature and pressure conditions to the synthesis gas generation. The pressure may, for example, be between 0.1 and 8 MPa, preferably between 1 and 4 MPa, and the temperature at the reverse water-gas shift reactor outlet may be between 75° and 2000° C., preferably between 80° and 1800° C., more preferably between 85° and 1600° C. The catalyst may be any suitable transition metal oxide catalyst, for example a catalyst based on nickel oxide, iron oxide or on chromium oxide, but other catalysts offered as reverse water-gas shift catalysts can be used. On operating under these conditions, it is possible to adjust the hydrogen to carbon monoxide molar ratio to a value to close to the value desired for the Fischer-Tropsch synthesis, while limiting the contents of unconverted methane and unconverted carbon dioxide.

In order to generate the high temperatures suitable for efficient operation of the reverse water-gas shift unit, the carbon dioxide stream may be heated electrically, for example using renewable energy, or in heat exchange with a suitable fluid, or in a fired heater. In preferred embodiments, the carbon dioxide and hydrogen stream may be heated in a combustion section of the reverse water-gas shift unit by combusting a portion of the carbon dioxide and hydrogen-containing stream with an oxidant. The combustion will consume some of the hydrogen. Excess hydrogen, above the 1:1 molar ratio, is be desirable in the feed gas. Hydrogen to carbon dioxide molar ratios in the range 1.5-7.5:1 may be used to produce a reverse water-gas shifted gas having the desired $H_2$:CO ratio for the Fischer-Tropsch synthesis. If desired, methane or another fuel may be included in the feed gas. In some embodiments, the Fischer-Tropsch tail gas may be fed to the reverse water-gas shift unit directly or, preferably, the Fischer-Tropsch tail gas may be subjected to a step of pre-reforming, where it is subjected to adiabatic steam reforming over a nickel catalyst to convert higher hydrocarbons present in the tail gas to methane, and the pre-reformed Fischer-Tropsch tail gas fed to the reverse water-gas shift unit. The combustion may be performed in an upstream combustion vessel or in a combustion zone within the reverse water-gas shift vessel upstream of a bed of reverse water-gas shift catalyst disposed within a reverse water-gas shift reaction vessel. The combustion may be performed non-catalytically or catalytically over a suitable oxidation catalyst, such as a platinum-containing catalyst. The oxidant is desirably pure oxygen, e.g. >98% vol $O_2$, as this minimises the inerts in the downstream Fischer Tropsch synthesis. This oxygen may conveniently be provided by the electrolysis unit. Accordingly, in some embodiments, an oxygen stream provided by the electrolysis unit may be used to combust a portion of a feed gas comprising carbon dioxide and hydrogen fed to the reverse water-gas shift unit to raise the temperature of the feed gas.

Hydrogen and oxygen for the process are generated using an electrolysis unit to which the FT water recovered from the Fischer-Tropsch hydrocarbon synthesis unit is fed. The electrolysis unit typically comprises one or more electrolysers that operates according to the general formula:

$$\text{Electricity} + 2H_2O \rightarrow 2H_2 + O_2$$

Electrolysis is the process for chemical decomposition of water to give oxygen and hydrogen under the action of an electric current. Industrial electrolysis is generally carried out at temperatures below 200° C. If desired, the FT water may be combined with potassium hydroxide, the concentration of which may vary as a function of the temperature (typically from 25% by weight at 80° C. up to 40% at 160° C.). Potassium hydroxide is preferred to sodium hydroxide, essentially for reasons of superior conductivity at an equivalent temperature level. Alternatively, polymer-electrode membrane electrolysers may be used. Alternatively, high-temperature electrolysis may be used in the process. High-temperature electrolysis is operated at high temperature (700 to 900° C.) and at reduced pressure. High-temperature electrolysis is more efficient than the process at ambient temperature since a portion of the energy necessary for the reaction is contributed via the heat, which is often cheaper to obtain than electricity, and electrolysis reactions have a better yield at high temperature.

The electrical energy necessary for the production of hydrogen in the electrolysis unit is preferably non-fossil fuel based so as not to emit carbon dioxide, or which is neutral in carbon dioxide emissions. One source of non-fossil fuel energy is nuclear energy. Other energy sources free of carbon dioxide emissions or neutral with regard to carbon dioxide emissions are renewable energies, such as photovoltaic solar energy, wind energy, tidal energy, waterpower or hydroelectricity, marine energy sources, geothermal energy and/or biomass. These non-fossil fuel energy sources can be used alone or as a combination of two or more of them in equal or different proportions.

The hydrogen used in the process is preferably produced by water electrolysis, the electrical energy for which is preferably provided by renewable energy sources, especially by solar energy, wind energy, tidal energy, geothermal energy and/or biomass. This is because these energy sources are distinguished in that they are virtually inexhaustible, are easy to access and do not produce or produce relatively little problematic waste.

The oxygen necessary for the synthesis gas generation in the synthesis gas generation unit includes oxygen produced by the electrolysis unit, supplemented if necessary by oxygen originating from an air separation unit. The use of the oxygen produced by electrolysis makes it possible to economize on the air separation unit conventionally used to supply the synthesis gas generation unit with oxidant.

In the present invention all of the oxygen recovered from the electrolysis unit may be used for the synthesis gas generation. The electrolysis unit may however, where the hydrogen requirement of the process requires, provide an excess of oxygen for export to other processes that require oxygen feeds and/or oxygen for combustion in the reverse water-gas shift unit. The portion of the oxygen produced by the electrolysis unit fed to the synthesis gas generation unit may be in the range 30-100% by volume of the total amount of electrolytic oxygen, and for reverse water gas shift combustion the portion of oxygen produced by the electrolysis may be in the range 0-70% by volume, preferably 10-50% by volume, more preferably 10-25% by volume of the total amount of electrolytic oxygen.

The hydrogen from the electrolysis unit is used in the process in the feed gas for the reverse water-gas shift unit. A portion of the hydrogen may also be fed to the Fischer-Tropsch hydrocarbon synthesis unit, i.e. a portion of the hydrogen from the electrolysis unit may bypass the reverse water-gas shift unit. Additionally, or alternatively, a portion of the hydrogen may me fed to the hydrotreating unit. The portion of hydrogen produced by the electrolysis unit fed to the reverse water-gas shift unit may be in the range 30-100% by volume, preferably 30-60% by volume, more preferably 40-50% by volume, of the total amount of electrolytic hydrogen. Preferably 40-60% of the electrolytic hydrogen is fed to the Fischer-Tropsch synthesis. Optionally 0-10% of the electrolytic hydrogen may be fed to the hydrotreating unit.

In addition to the electrolysis unit, external sources of hydrogen may be used in the process, but this is less preferred and generally not required.

The process of the present invention thereby provides a more efficient, more environmentally friendly way of generating valuable Fischer-Tropsch hydrocarbon products than the prior art processes.

The invention is illustrated by reference to the accompanying drawing in which:

FIG. 1 is a diagrammatic flowsheet of one embodiment of the invention.

It will be understood by those skilled in the art that the drawings are diagrammatic and that further items of equipment such as reflux drums, compressors, pumps, vacuum pumps, temperature sensors, pressure sensors, pressure relief valves, control valves, flow controllers, level controllers, holding tanks, storage tanks, and the like may be required in a commercial plant. The provision of such ancillary items of equipment forms no part of the present invention and is in accordance with conventional chemical engineering practice.

In FIG. 1, a municipal solid waste or equivalent feedstock is fed via line 10 to a synthesis gas generation unit 12 comprising a gasifier that is fed with an oxygen gas stream via line 14 produced in an electrolysis unit 16. In the gasifier, the feedstock is reacted at elevated temperature and pressure with oxygen to produce a synthesis gas stream comprising hydrogen, carbon monoxide, carbon dioxide and steam. The synthesis gas generation unit may further comprise separate partial oxidation or tar-reforming units downstream of the gasifier to effect complete conversion of the feedstock to synthesis gas. The synthesis gas generation unit 12 may further comprise heat exchange equipment to cool the synthesis gas to below the dew point and one or more gas-liquid separation vessels to recover condensate from the synthesis gas.

The synthesis gas is passed from the synthesis gas generation unit 12 at a suitable temperature and pressure via line 18 to a carbon dioxide removal unit 20 operating by means of absorption using a liquid absorbent wash system. The wash system in the carbon dioxide removal unit produces a carbon dioxide stream and a purified synthesis gas stream comprising hydrogen and carbon monoxide. Upstream of the carbon dioxide removal unit, one or more purification steps (not shown) may be used to remove unwanted contaminants, such as carbonyl sulphide, hydrogen cyanide and heavy metals such as mercury from the synthesis gas recovered from the synthesis gas generation unit.

The carbon dioxide stream is recovered from the carbon dioxide removal unit 20 via line 22, treated if necessary to remove residual contaminants, such as hydrogen sulphide, in a purification unit (not shown) and fed at a suitable temperature and pressure to a reverse water-gas shift unit 24 comprising a vessel containing a suitable transition metal oxide reverse water-gas shift catalyst. The reverse water-gas shift unit is fed with a hydrogen stream via line 26. Where the reverse water-gas shift unit includes a combustion section to preheat the feed gas, an oxygen stream may optionally be provided from the electrolysis unit 16 via a line 41. Carbon dioxide and hydrogen react over the reverse water-gas shift catalyst to produce a product gas stream comprising carbon monoxide and water vapour. The reverse water gas shift unit includes heat exchange apparatus downstream of the reverse water-gas shift reactor that cools the product gas to below the dew point and one or more gas-liquid separators that separate the resulting condensate to provide a carbon monoxide-containing gas stream.

The carbon monoxide-containing gas stream recovered from the reverse water-gas shift unit 24 may contain unreacted carbon dioxide, in which case the carbon monoxide containing gas may be fed to the carbon dioxide removal unit 20 or, preferably, is fed to a separate carbon dioxide removal unit (not shown) downstream of the one or more gas-liquid separators within the reverse water-gas shift unit 24. An advantage of using a separate carbon dioxide removal unit within the reverse water-gas shift unit is that the carbon dioxide is less likely to contain contaminants and so the carbon dioxide removal unit may be operated differently and/or use a different absorbent at a smaller scale. The carbon dioxide recovered from the carbon monoxide-containing gas stream is recycled to the reverse water-gas shift reactor.

The output from the reverse water-gas shift unit, including any carbon dioxide removal step, is a carbon monoxide gas stream.

The carbon monoxide gas stream is recovered from the reverse water-gas shift unit 24 via line 28 and combined with a synthesis gas recovered from the carbon dioxide removal unit 20 via line 30 to form a combined gas mixture in line 32. The combined gas mixture may if desired be treated in a purification unit (not shown) to remove residual contaminants and FT catalyst poisons, such as hydrogen sulphide, downstream of the carbon dioxide removal unit 20 and upstream of a Fischer-Tropsch hydrocarbon synthesis unit 38.

The combined gas mixture in line 32 may optionally be combined with a hydrogen gas stream provided by line 34 to adjust the hydrogen to carbon monoxide molar ratio, if desired, and the resulting mixture fed via line 36 at a suitable temperature and pressure to the Fischer-Tropsch hydrocarbon synthesis unit 38.

The Fischer-Tropsch hydrocarbon synthesis unit 38 comprises a tubular reaction vessel containing catalyst carriers containing a cobalt Fischer-Tropsch catalyst disposed in a plurality of tubes within the reactor. The hydrogen and carbon monoxide react over the catalyst to form a mixture of gaseous and liquid hydrocarbons and FT water as a by-product. The mixture of hydrocarbons is processed within the hydrocarbon synthesis unit 38 to separate the FT water from the gaseous and liquid hydrocarbons. The FT water is recovered from the Fischer-Tropsch hydrocarbon synthesis unit 38 and fed via line 40 to the electrolysis unit 16.

The electrolysis unit 16 comprises one or more electrolysers that convert the FT water 40 into oxygen and hydrogen using electrical energy provided by an electrical energy supply (not shown). Oxygen produced by the electrolysis unit is fed via line 14 to the synthesis gas generation unit 12. If a combustion unit is provided in the reverse water-gas shift unit, oxygen may be provided to it by the electrolysis unit 16 via line 41. Any excess oxygen may be sent to a separate process by an export line (not shown). Hydrogen is recovered from the electrolysis unit 16 via line 42. Hydrogen from line 42 is provided via line 26 to the reverse water-gas shift unit 24. Optionally, a portion of the hydrogen in line 42 may bypass the reverse water gas shift unit 24 and be fed via line 34 directly to the feed gas for the Fischer-Tropsch hydrocarbon synthesis unit 38. Optionally, a portion of the hydrogen from line 42 may be provided via line 56 to the hydrotreating unit 46.

The Fischer-Tropsch hydrocarbon synthesis unit 38 produces one or more hydrocarbon streams, including but not limited to a molten hydrocarbon wax and/or light hydrocarbon condensate, which is liquid at ambient temperature. One or more of the hydrocarbon products from the Fischer-Tropsch hydrocarbon synthesis unit 38 is fed at a suitable temperature and pressure via line 44 to a hydrotreating unit 46. The hydrotreating unit comprises one or more vessels containing a catalyst, such as a hydroisomerization, hydrogenation, hydrodeoxygenation, and/or hydrocracking catalyst, that converts the hydrocarbon wax or hydrocarbon condensate into one or more valuable hydrocarbon products. The hydrotreating unit is fed with hydrogen. Any source of hydrogen may be used, however, suitably the hydrotreating unit 46 is fed with a portion of the hydrogen produced by the electrolysis unit 16 via line 56. Valuable hydrocarbon products, such as kerosene, are recovered from the hydrotreating unit 46 via line 48.

In further embodiments, the process may be enhanced as follows;

1. The reverse water-gas shift unit 24 produces water as a by-product. The water, or a portion of it, may be fed from the reverse water-gas shift unit 24 via line 52 to the electrolysis unit to supplement the FT water. The FT water may also be supplemented with a supplemental water feed via line 54 if necessary.
2. The Fischer-Tropsch hydrocarbon synthesis unit 38 produces gaseous hydrocarbons as part of the hydrocarbon mixture. A portion of the gaseous hydrocarbons may be recovered from the Fischer-Tropsch hydrocarbon synthesis unit 38 and fed via line 58 as a FT tail gas back to the synthesis gas generation unit 12 where it may be used as fuel, and/or steam reformed and/or subjected to partial oxidation to form a hydrogen/carbon monoxide-containing gas stream for use in the process, or combined with the feedstock. Alternatively, or in addition, a portion of the FT tail gas may be fed directly to the reverse water-gas shift unit 24 or subjected to a step of adiabatic steam reforming (pre-reforming) to convert higher hydrocarbons to methane, and the resulting pre-reformed gas mixture fed to the reverse water-gas shift unit 24.

3. A cryogenic air separation unit (ASU), not shown, may be used to generate supplemental oxygen that is fed to the synthesis gas generation unit via line 60.

The invention will be further described by reference to the following calculated example of a flowsheet according to FIG. 1 in which, additionally, $O_2$ from the electrolysis unit 16 was fed to a combustion section of a reverse water-gas shift reactor and a portion of the hydrogen from line 42 was fed to the hydrotreating unit 46 via line 56 The flowsheet was based on 1000 kmol/h of syngas from syngas generation unit 12 and the final FT production, expressed as "$CH_2$" was based on CO content to provide a final comparison.

| Molar Flowrate: | | Stream | | | | | | | |
| --- | --- | --- | --- | --- | --- | --- | --- | --- | --- |
| | | 14 | 18 | 22 | 26 | 28 | 30 | 32 | 36 |
| Water | kmol/h | — | — | — | — | — | — | — | — |
| Hydrogen | kmol/h | — | 404 | — | 1573 | 851 | 404 | 1255 | 1255 |
| Carbon Monoxide | kmol/h | — | 351 | — | — | 241 | 351 | 592 | 592 |
| Carbon Dioxide | kmol/h | — | 245 | 241 | — | — | 4 | 4 | 4 |
| Oxygen | kmol/h | 420 | — | — | — | — | — | — | — |
| FT Product (as moles of $CH_2$) | kmol/h | — | — | — | — | — | — | — | — |
| Total | kmol/h | 420 | 1000 | 241 | 1573 | 1092 | 759 | 1851 | 1851 |

| Molar Flowrate: | | Stream | | | | | | | |
| --- | --- | --- | --- | --- | --- | --- | --- | --- | --- |
| | | 40 | 41 | 42 | 44 | 48 | 52 | 54 | 56 |
| Water | kmol/h | 564 | — | — | — | — | 723 | 319 | — |
| Hydrogen | kmol/h | — | — | 1605 | — | — | — | — | 31 |
| Carbon Monoxide | kmol/h | — | — | — | — | — | — | — | — |
| Carbon Dioxide | kmol/h | — | — | — | — | — | — | — | — |
| Oxygen | kmol/h | — | 241 | — | — | — | — | — | — |
| FT Product (as moles of $CH_2$) | kmol/h | — | — | — | 507 | 507 | — | — | — |
| Total | kmol/h | 564 | 241 | 1605 | 507 | 507 | 723 | 319 | 31 |

US 12,618,011 B2

15                                                                    16

A comparative example without the reverse water-gas shift unit 24 coupled to the ID 22T electrolysis unit 16 was also modelled on the same basis. The results were as follows;

| Molar Flowrate: | | Stream | | | | | |
|---|---|---|---|---|---|---|---|
| | | 14 | 18 | 22 | 30 | 34 | 36 |
| Water | kmol/h | — | — | — | — | — | — |
| Hydrogen | kmol/h | — | 404 | — | 404 | 340 | 744 |
| Carbon Monoxide | kmol/h | — | 351 | — | 351 | — | 351 |
| Carbon Dioxide | kmol/h | — | 245 | 241 | 4 | — | 4 |
| Oxygen | kmol/h | 179 | — | — | — | — | — |
| FT Product (as moles of CH$_2$) | kmol/h | — | — | — | — | — | — |
| Total | kmol/h | 179 | 1000 | 241 | 759 | 340 | 1099 |

| Molar Flowrate: | | Stream | | | | | | |
|---|---|---|---|---|---|---|---|---|
| | | 40 | 42 | 44 | 48 | 54 | 56 | 60 |
| Water | kmol/h | 335 | — | — | — | 24 | — | — |
| Hydrogen | kmol/h | — | 359 | — | — | — | 19 | — |
| Carbon Monoxide | kmol/h | — | — | — | — | — | — | — |
| Carbon Dioxide | kmol/h | — | — | — | — | — | — | — |
| Oxygen | kmol/h | — | — | — | — | — | — | 241 |
| FT Product (as moles of CH$_2$) | kmol/h | — | — | 301 | 301 | — | — | — |
| Total | kmol/h | 335 | 359 | 301 | 301 | 24 | 19 | 241 |

The FT product in this case at 301 kmol/h is 41% lower than the case containing the reverse water-gas shift unit.

The invention claimed is:

1. A process for synthesising hydrocarbons comprising the steps of (a) making a synthesis gas comprising hydrogen, carbon monoxide and carbon dioxide from a feedstock in a synthesis gas generation unit, (b) removing carbon dioxide from the synthesis gas in a carbon dioxide removal unit to produce a carbon dioxide stream and purified synthesis gas comprising hydrogen and carbon monoxide, and (c) synthesising a mixture of hydrocarbons from the purified synthesis gas in a Fischer-Tropsch (FT) hydrocarbon synthesis unit, with co-production of a FT water stream, wherein (i) at least a portion of the FT water stream is fed to an electrolysis unit to provide an oxygen stream, which is fed to the synthesis gas generation unit, and a hydrogen stream, (ii) at least a portion of the carbon dioxide stream recovered from the carbon dioxide removal unit and a portion of the hydrogen stream produced by the electrolysis unit are fed to a reverse water-gas shift unit to produce a carbon monoxide stream, and (iii) at least a portion of the carbon monoxide stream from the reverse water-gas shift unit is fed to the Fischer-Tropsch hydrocarbon synthesis unit; wherein the FT water stream is treated upstream of the electrolysis unit to remove contaminants.

2. The process according to claim 1, wherein the feedstock comprises natural gas, associated gas, coal, biomass or municipal solid waste or equivalent containing non-biogenic carbon.

3. The process according to claim 2, wherein the feedstock is natural gas and the synthesis gas generation unit comprises a catalytic partial oxidation unit, a non-catalytic partial oxidation unit or an autothermal reformer.

4. The process according to claim 2, wherein the feedstock is coal, biomass or municipal solid waste or equivalent containing non-biogenic carbon and the synthesis gas generation unit comprises a gasifier, optionally with one or more downstream processing units selected from a partial oxidation unit, a tar reforming unit and purification reactors containing a purification material.

5. The process according to claim 1, wherein the carbon dioxide removal unit comprises a physical wash system or a reactive wash system.

6. The process according to claim 1, wherein the Fischer-Tropsch hydrocarbon synthesis unit comprises a tubular reactor in which catalyst carriers containing a Fischer-Tropsch catalyst are disposed within one or more tubes cooled by a cooling medium.

7. The process according to claim 1, further comprising a step (d) of upgrading the mixture of hydrocarbons synthesised in the Fischer-Tropsch hydrocarbon synthesis unit in a hydrotreating unit to produce hydrocarbon products.

8. The process according to claim 7, wherein the hydrotreating unit comprises one or more vessels containing a catalyst selected from a hydroisomerization catalyst, a hydrogenation catalyst, a hydrodeoxygenation catalyst, and/or a hydrocracking catalyst.

9. The process according to claim 7, wherein a portion of the hydrogen stream from the electrolysis unit is fed to the hydrotreating unit.

10. The process according to claim 1, wherein a water stream produced by the reverse water gas shift unit is fed to the electrolysis unit.

11. The process according to claim 1, wherein a portion of the hydrogen stream from the electrolysis unit is fed to the Fischer-Tropsch hydrocarbon synthesis unit.

12. The process according to claim 1, wherein an oxygen stream provided by the electrolysis unit is used to combust a portion of a feed gas comprising carbon dioxide and hydrogen fed to the reverse water-gas shift unit to raise the temperature of the feed gas.

13. The process according to claim 1, wherein water formed in the reverse water-gas shift unit is fed to the electrolysis unit.

14. The process according to claim 1, wherein a tail gas comprising one or more of methane, ethane, propane, butane and C5-C10 hydrocarbons, is recovered from the Fischer-Tropsch hydrocarbon synthesis unit, and is fed to the synthesis gas generation unit.

15. The process according to claim 1, wherein a tail gas comprising one or more of methane, ethane, propane, butane and C5-C10 hydrocarbons, is recovered from the Fischer-Tropsch hydrocarbon synthesis unit, and is subjected to a separate reforming step to form a reformed tail gas containing hydrogen, which is fed to the Fischer-Tropsch hydrocarbon synthesis unit and/or the reverse water-gas shift unit.

16. The process according to claim 1, wherein the hydrocarbon products recovered from the hydrotreating unit are fed to a separation unit to recover C1-C4 gases, a naphtha fraction, at least one kerosene and/or gas oil fraction and a heavy fraction.

17. A system for performing the process according to claim 1 comprising (I) the synthesis gas generation unit, (II) the carbon dioxide removal unit coupled to the synthesis gas generation unit, and (III) the Fischer-Tropsch hydrocarbon synthesis unit coupled to the carbon dioxide removal unit, wherein:

the electrolysis unit is coupled to the Fischer-Tropsch hydrocarbon synthesis unit, the reverse water-gas shift unit is coupled to the carbon dioxide removal unit and the electrolysis unit, and the Fischer-Tropsch hydrocarbon synthesis unit is coupled to the reverse water-gas shift unit.

18. The system according to claim 17, further comprising (IV) a hydrotreating unit coupled to the Fischer-Tropsch hydrocarbon synthesis unit for upgrading the mixture of hydrocarbons to produce hydrocarbon products.

\* \* \* \* \*